(12) United States Patent
Beam et al.

(10) Patent No.: US 12,291,274 B2
(45) Date of Patent: May 6, 2025

(54) AUTOMOTIVE TRIM PART BASED ON RECYCLED MATERIALS

(71) Applicant: AUTONEUM MANAGEMENT AG, Winterthur (CH)

(72) Inventors: Andrew Beam, Lexington, KY (US); Marita Hess, Benton, PA (US)

(73) Assignee: AUTONEUM MANAGEMENT AG, Winterthur (CH)

( * ) Notice: Subject to any disclaimer, the term of this patent is extended or adjusted under 35 U.S.C. 154(b) by 0 days.

(21) Appl. No.: 18/059,158

(22) Filed: Nov. 28, 2022

(65) Prior Publication Data
US 2024/0174298 A1    May 30, 2024

(51) Int. Cl.
| | |
|---|---|
| *B62D 25/16* | (2006.01) |
| *B32B 25/08* | (2006.01) |
| *B32B 25/14* | (2006.01) |
| *B32B 37/20* | (2006.01) |
| *B32B 38/16* | (2006.01) |

(52) U.S. Cl.
CPC ............ *B62D 25/161* (2013.01); *B32B 25/08* (2013.01); *B32B 25/14* (2013.01); *B32B 37/206* (2013.01); *B32B 38/162* (2013.01); *B32B 2250/03* (2013.01); *B32B 2250/24* (2013.01); *B32B 2250/40* (2013.01); *B32B 2260/023* (2013.01); *B32B 2260/046* (2013.01); *B32B 2272/00* (2013.01); *B32B 2274/00* (2013.01); *B32B 2305/30* (2013.01); *B32B 2305/70* (2013.01); *B32B 2307/718* (2013.01); *B32B 2319/00* (2013.01); *B32B 2367/00* (2013.01); *B32B 2605/00* (2013.01)

(58) Field of Classification Search
CPC ..................................................... B62D 25/16
USPC .......................................................... 428/219
See application file for complete search history.

(56) References Cited

U.S. PATENT DOCUMENTS

2020/0122651 A1* 4/2020 Delpero .............. B60R 13/0815
2023/0405944 A1* 12/2023 Godano .................... B32B 5/26

FOREIGN PATENT DOCUMENTS

| JP | 2000015758 A | * | 1/2000 | |
|---|---|---|---|---|
| JP | 2003320532 A | * | 11/2003 | |
| JP | 2004025824 A | * | 1/2004 | ............ B32B 27/08 |
| JP | 2007301774 A | * | 11/2007 | |

(Continued)

OTHER PUBLICATIONS

Machine_English_translation_JP_2007301774_A; Ouchi, Manabu, Base Material for Car Trim Material and Car Trim Material; Nov. 22, 2007; EPO; whole document (Year: 2023).*

(Continued)

*Primary Examiner* — Tahseen Khan
(74) *Attorney, Agent, or Firm* — FisherBroyles, LLP; Craig W. Mueller

(57) ABSTRACT

An automotive trim part is provided made of a laminated structure generally consisting of a thermoplastic core layer extruded from at least one feedstock derived from recycled material. The feedstock may consist at least partially of vehicle trim part waste from another vehicle, or trim part waste associated with an automotive trim part the same or similar to the part being produced. The core layer is preferably covered by fibrous layers and may be configured for use at least as a portion of a vehicle's wheel well.

22 Claims, 2 Drawing Sheets

(56) References Cited

FOREIGN PATENT DOCUMENTS

WO     WO-2022073897 A1 *   4/2022   ............ B29C 70/12

OTHER PUBLICATIONS

Machine_English_translation_JP_2004025824_a1; Hashimoto, et al. Recycled Foamed Laminated Sheet for Automobile Upholsteries; Jan. 29, 2004; EPO; whole document (Year: 2024).*

Machine_English_translation_JP_2003320532_a1; Hashimoto, et al. Method for Separating Resin Material of interior finishing material for automobile; Nov. 11, 2023; EPO; whole document (Year: 2024).*

Machine_English_translation_JP_2000015758_A; Honjo; Automobile Interior Part and its Manufacture; Jan. 18, 2000; EPO; whole document (Year: 2024).*

* cited by examiner

AUTOMOTIVE TRIM PART BASED ON RECYCLED MATERIALS

FIELD OF THE INVENTION

The present invention is generally directed to an automotive trim part for fitting automotive areas that need covering by a rigid structure, like a wheel well for a car or a motor encapsulation, as well as a method of producing such trim parts. Such trim parts may be useful for both passenger vehicles and trucks.

BACKGROUND OF THE INVENTION

According to the prior art, trim parts used to close gaps or cover parts were made as laminated structures with either a solid plastic or foamed plastic core layer and a needled nonwoven layer laminated to one surface of the core layer. Eventually, other layers may be laminated to the other surface of the core layer. The trim part is formed to fit the dedicated area or the functional design wanted by the car maker, e.g., the intricate curved design for covering the wheel well area on the exterior of the vehicle or a full encapsulating trim part for a motor-E-motor or engine.

In a standard process for such trim parts, laminated blank sheets or rolls are produced first, and the parts are cut out and formed of the blank, which creates a high level of laminated material that is difficult to recycle or reuse. In particular, the material used for the core layer is not compatible with the material of cover layers. In the case of wheel well liners or trim parts, the waste created during production might be up to 50% of the original blank. Although optimized cutting may reduce this percentage, the complex shape makes it difficult to completely eliminate waste.

In view of the increased awareness for zero waste production processes and to create better recycling for post-consumer waste, carmakers are requesting more sustainable solutions both in the material used and the waste management. The current production of the wheel cover parts may need realignment in the direction of a more sustainable product process.

It is a goal of embodiments of the current invention to provide an alternative, in particular, a more sustainable manufacturing solution for automotive trim parts, such as outer wheel well or fender liners, or seat back trim parts, while maintaining the functional requirements of the parts produced.

SUMMARY OF THE INVENTION

It is one aspect of some embodiments of the present invention to provide a near-zero or zero-waste manufacturing process by recycling production waste of produced parts back into the manufacturing process or by integrating post-consumer waste of other automotive parts into the manufacturing process. The subject of one embodiment of the invention is an automotive trim part comprising a laminated structure with at least a thermoplastic core layer sandwiched between fibrous cover layers comprising polyester fibers. One contemplated process uses a core layer comprising an extrudate mixture of at least a feedstock A and a feedstock B. Feedstock A consists of vehicle trim part waste (e.g., bumper fascia waste comprising thermoplastic olefin elastomer (TPO) based material). Feedstock B consists of automotive trim part waste comprising a laminated structure consisting of at least a thermoplastic core panel sandwiched between fibrous cover layers at least partially comprised of polyester fibers (i.e., a structure identical or similar to the part being produced).

Surprisingly, producing a wheel liner from a combination of feedstock A (recycled thermoplastic olefin-based elastomer material) and feedstock B from the production process shows an improved stone chipping and impact performance, resulting in a decreased weight loss after a stone impact test of the wheel liner even at very low temperatures, e.g., below −40° C. Despite one embodiment of the present invention using recycled feedstock and including polyester fiber fragments in the core layer, the weight reduction associated with stone chipping could be reduced by 10% compared with a state-of-the-art trim part of a similar layout. The mixture of feedstocks coming from recycled material from the production process itself as well as from post-consumer products provides for a sustainable solution for both waste streams resulting in a stiff elastic panel that may be used both in the interior and the exterior of vehicles, for passenger cars and trucks.

For both recycling streams, the post-consumer car parts based on TPO forming feedstock A, as well as the recycling of the waste coming from the automotive trim part production according to the invention, including the sandwich material, mechanical recycling only involving mechanical processes like grinding, shredding, washing, separating, drying, re-granulating and compounding, may be sufficient. In cases with a high polyester load which would lead to a level of polyester above 12% of weight in the core layer, an additional melt filtration step might be used to reduce the polyester fiber content. This might be the case if the fibrous layers together have a higher area weight and/or if a polyester-based binder is used.

A melt filtration step might be included to reduce any paint or paint adhesives or other unwanted residues that might negatively influence the final layer's properties or the odor or emission of unwanted components. For instance, a melt filtration to further purify the extrudate might be necessary to reduce any volatile compounds that are not allowed when used in an enclosed environment such as automotive interiors, for instance, when used as a back seat cover in the passenger compartment.

Feedstock A is based on post-consumer automotive parts that are destined for waste, for instance, post-crash bumper fascia. In recent years, these parts are more homogenous in material usage, and the largest portion of this part is now made from a TPO-based material.

Thermoplastic olefin, thermoplastic polyolefin, or olefinic thermoplastic elastomers (TPO), as used in the scope of the current invention, is a blend of polyethylenes, for instance, a high molecular weight polyethylene (HMWPE) or polypropylene (PP), an elastomeric component like natural rubber or synthetic rubber, preferably EPDM, and a reinforcing filler, preferably an inert filler-often calcium carbonate, carbon fiber, or talc. Reactor grades and/or compounded TPO may be used in bumper fascia.

Preferably recycled bumper feedstock is used with a TPO being a blend of isotactic polypropylene (PP) with ethylene-propylene rubber, for instance, an ethylene-propylene monomer, EPM, or ethylene propylene-diene monomer, EPDM.

Preferably bumper fascia based on PP-EPDM is chosen as the main component for feedstock A. The percentage of Ethylene Propylene Diene Monomer (EPDM) in the polypropylene (PP) may be in the range from 5 to 30% by weight.

In practice, the front bumper fascia may have no filler, while the rear bumper fascia's may have an inert filler. Both may be used alone or in combination to form the recycled feedstock A. The process of producing the trim part according to the invention allows for a certain fluctuation in the amount of filler material. This includes cases where the inert filler and the polyester behave like an additional filler. Also, low amounts of paint residue may be incorporated into the feedstock as filler component.

Preferably the percentage of mineral filler, for instance, $CaCO_3$, $BaSO_4$, or Mica, may range between 14-20% by weight.

Feedstock A may further comprise some additives to enhance the performance, like polymers or copolymers to increase the MFI or to boost the PP content or to reduce the overall filler content.

Surprisingly, the material from post-consumer waste may be recycled and reused as a core layer for a trim part without substantially reducing its overall properties. It was found that as long as the polyester content in the core layer, derived from recycled automotive trim parts containing the sandwich construction, is less than 12% by weight of the core, the material maintains good resilience against impact and can rebound upon minor impacts from smaller stones, for example. Furthermore, it was found that the increased elasticity obtained by the rubber or elastomeric component used in the TPO aids the forming and mounting of the automotive trim part. Furthermore, the loss factor achieved with the material enhances the noise attenuation of particular impact noises, like stone chipping or water splash noises.

The recycled TPO used for feedstock A may have a flexural modulus in the range of 750 to 1300 Mpa (109-188 kpsi) and a Melt Flow Index in the range of 4 to 20 gm/10 min at 190° C. (Melt flow Index (MFI) measured according to ISO 1133 (at 190° C. and 2.16 kg load)).

Preferably, the core layer comprises a total inert filler content up to 40% by weight of the core layer, preferably not more than 30% by weight of the core layer. (Total filler is any inert, polyester or residue-based filler material not contributing otherwise to the performance of the layer)

In addition, the core layer comprises polyester derived from feedstock B. The total polyester filler content may be up to 12% by weight of the core layer.

The automotive trim part further includes fibrous layers to cover the core on both sides. At a minimum, a scrim layer may be used on both layers to aid the production process and prevent the material from sticking to the mold or any other surface. Preferably, at least one of the fibrous layer is increased in thickness and or density. However, the area weight of the polyester content of the all fibrous layers is up to 450 g/m2, preferably 250 g/m2, more preferably, 150 g/m2. Less area weight is beneficial for the recycled content of polyester in the core layer. However, an area weight of up to 12% by weight of the core layer may not have a negative impact on the stiffness of the layer.

At least one of the fibrous layers comprises a thermoplastic binder, preferably, polypropylene, or a polyester based binder with a melting point lower than the fibrous material, preferably a terephthalate-based copolymer polyester.

Preferably a polypropylene-based binder is chosen. Using polypropylene as the basis for the binder would enhance the core layer with PP upon the recycling process proposed and would keep the overall level of polyester low.

The area weight of the core layer is between 500 and 3000 g/m2, preferably between 700 and 2000 g/m2, more preferably, between 1000 and 1700 g/m2. In principle, the lighter the part the better for the CO2 consumption of the car while driving, however the area weight of the core layer may depend on the overall design of the automotive part produced as well as the amount of binder points integrated for mounting the part to the car, in particular, relevant for an outer wheel liner.

The trim part may comprise additional layers or patches laminated to at least one of the fibrous surfaces, at least partly covering the layer underneath. Preferably a consolidated fibrous layer may be used, preferably based on polypropylene or glass fibers with an olefin-based binder, for instance, a Polypropylene glass fiber felt or a polypropylene polyester fiber felt or patch. The use of such an additional layer may increase the acoustic absorption of noise generated at the tire, preventing it from entering the interior passenger compartment.

Surprisingly, the combination of recycled TPO material used as feedstock together with feedstock coming from the sandwich trim part production shows an improved stone chipping and impact performance of the wheel liner, resulting in a decreased weight loss after a stone impact test of the wheel liner even at very low temperatures down to −30° C.

The mixture of two feedstocks from recycled material, both from the production process itself as well as from post-consumer products, provides a sustainable solution for both waste streams, combined with fibrous layers resulting in a stiff elastic sandwich that may be used both in the interior and the exterior of vehicles, for passenger cars and trucks.

It is one aspect of some embodiments of the present invention to provide an automotive trim part made of a laminated structure comprising: a thermoplastic core layer comprising an extrudate of a mixture of at least: feedstock A that consists of at least partially of vehicle trim part waste, and feedstock B that consists of automotive trim part waste comprising a laminated structure with at least a thermoplastic core panel and fibrous cover members, whereby the core panel is sandwiched between the fibrous cover members, and whereby the fibrous cover members includes polyester fibers; and fibrous cover layers that comprise polyester fibers, whereby the core layer is sandwiched between the fibrous cover layers.

It is yet another aspect of some embodiments of the present invention to provide a method of producing the automotive trim part comprising: collecting and cleaning a first waste material obtained from post-consumer TPO-based products; reducing the first waste material size by shredding, grinding, or milling; pelletizing the first waste material that has been reduced in size to create a first feedstock; collecting a second waste material obtained from the production of the automotive trim parts; reducing the second waste material size by shredding, grinding, or milling; pelletizing the second waste material that has been reduced in size to create a second feedstock; thermally extruding at least one of the first feedstock and the second feedstock to form a core layer; and sandwiching the core layer between a first fibrous layer and a second fibrous layer.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

All publications mentioned herein are incorporated herein by reference to disclose and describe the methods and/or materials in connection with which the publications are cited.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
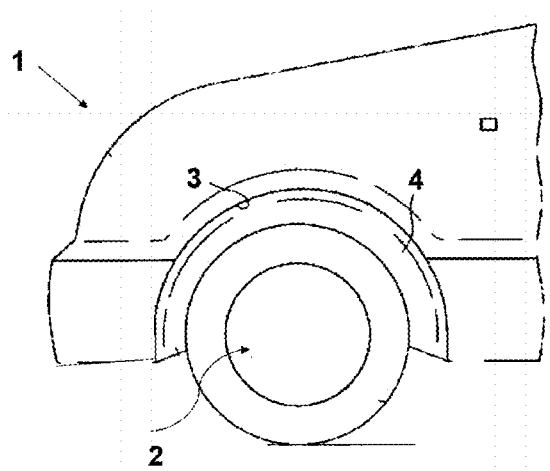
FIG. 1 shows a part of a vehicle.

FIG. 1 shows a part of a vehicle 1 with a wheel 2, placed within the body of the car in a wheel-well 3. The wheel-well 3 may be lined with a wheel well liner according to the invention. Wheel well liners may also be known as outer wheel liner or fender liner or wheel arch liners or any combination of the previous expressions. In principle, these parts may be placed on each, some or all wheel wells of a vehicle. A passenger vehicle is shown, but these parts may also be used on larger road vehicles like small vans or trucks.

Figure 2:
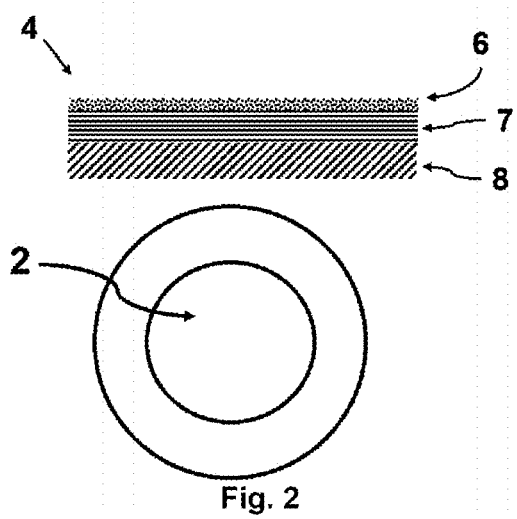
FIG. 2 shows a cross section of an example of the trim part according to the invention.

FIG. 2 shows a cross-section of a wheel well liner 4 according to the invention with fibrous outer layers 6 and 8 and a core layer 7. In this example, the fibrous layers differ in thickness; preferably, a thicker nonwoven 8 is used on the side facing the wheel 2, so any road noise may be absorbed while the noise of stone chipping against the liner may be further reduced.

The core layer is surface-to-surface laminated to the adjacent fibrous layers. This may be achieved by the hot application of the extrudate, forming the core layer 7 onto the first fibrous layer, and covering it with a second fibrous layer. The material is directly rolled into a flat sandwich with a raised temperature, whereby the material can partly engulf some of the surface fibers of the adjacent fibrous layers and form an inseparable bond between the layers. Inseparable means in this case the layers cannot be separated without impairing the integrity of the single layers. The core layer comprises an extrudate of a mixture of at least a feedstock A of vehicle trim parts waste, preferably bumper fascias comprising thermoplastic olefin elastomer, preferably consisting of polypropylene based elastomer, and a feedstock B of automotive trim part waste comprising a laminated structure with at least a thermoplastic core panel and fibrous cover layers, whereby the core layer is sandwiched between the fibrous cover layers, and whereby the fibrous cover layers comprises polyester fibers.

Figure 3:
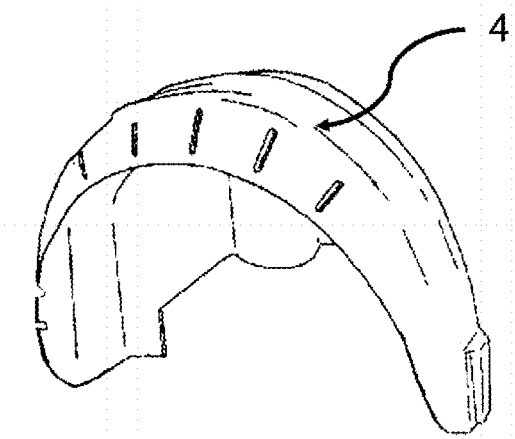
FIG. 3 shows an example of an outer wheel liner or fender liner according to the invention.

FIG. 2 shows the layering of a trim part 4 according to one embodiment of the invention. In practice, the automotive trim part used as a wheel well liner is formed to fit inside the wheel well and form a liner following the curve of the wheel well as well as behind the wheel as a side trim part. Hence these parts are intricate 3D shapes. FIG. 3 shows an example of a formed outer wheel liner 4.

Figure 5:
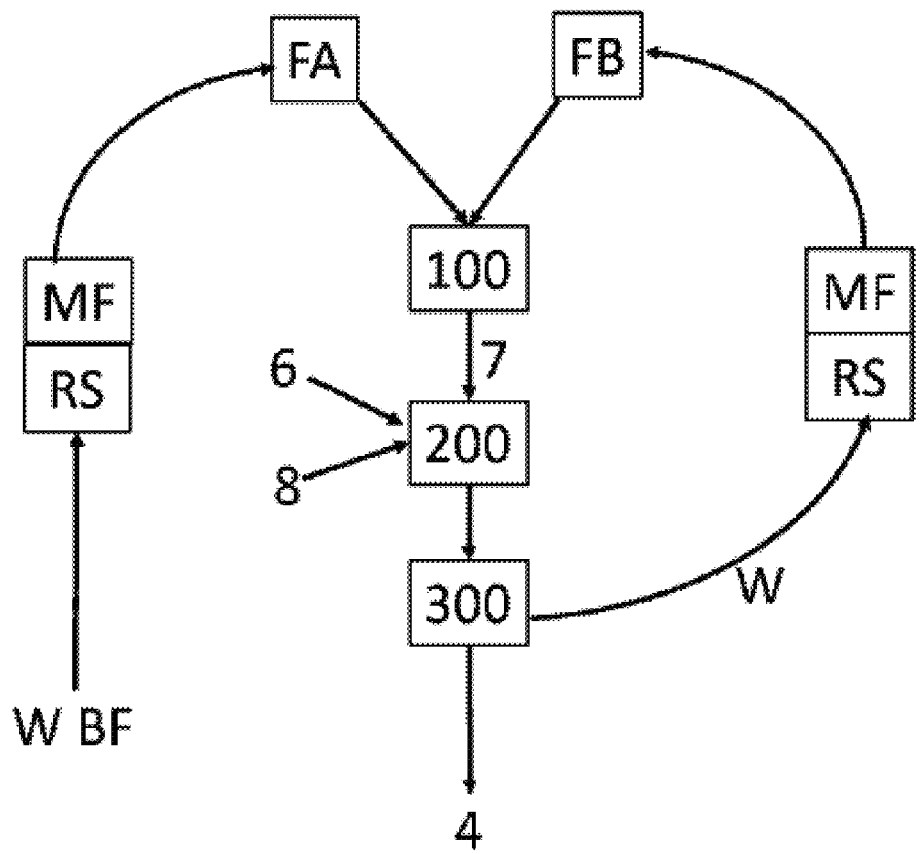
FIG. 5 shows a bumper fascia forming a possible source of post-consumer feedstock A in the process as depicted in FIG. 4 and according to the invention.

FIG. 5 shows a possible production and recycling process for the automotive trim part according to the invention.

Figure 4:
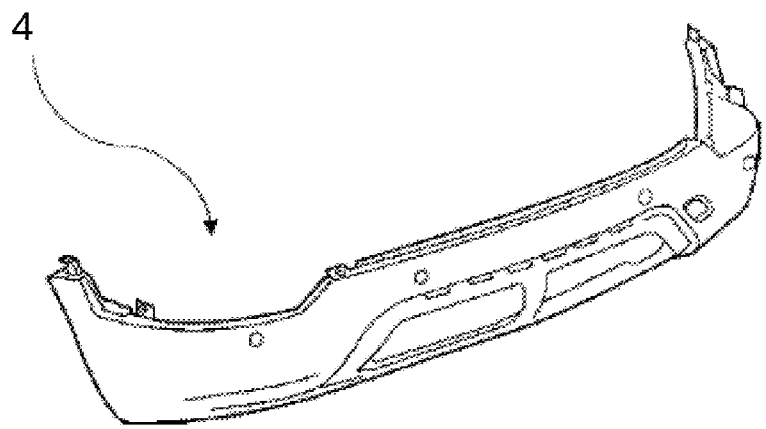
FIG. 4 shows a possible recycling and production process according to the invention.

In a first stream, post-consumer TPO-based waste (WBF), for instance, bumper fascias, is collected and eventually cleaned. In a one or two-step process, the waste is reduced in size (RS), for instance, by using shredders or grinding machines, and optionally melt filtrated (MF) to reduce all purities further. After the MF, the TPO-based material is pelletized to form feedstock A. Optionally, the shredded waste undergoes a further step to eliminate any paint or paint adhesive residue; preferably, this step should be between RS and MF. An example of an automotive trim part that may be the source is shown in FIG. 4.

Waste (W) from the production of the automotive trim part, like cut-outs, cut-offs, and rejected parts, are also reduced in size RS, by shredding, grinding, or milling and may be subjected to a melt filtration step if necessary. After the MF the material is pelletized and forms feedstock B. In principle, all waste W, including all layers, may be used to form feedstock B.

Step 100 designates mixing of feedstock A and feedstock B. Feedstock A and B may be already mixed in the pellet form to enhance the mixing during the thermal extrusion to form the core layer 7. Feedstock B will be used in full and Feedstock A will be added up to the required weight needed. In a full production run, Feedstock B may be up to 50% by weight of the total feedstock used. Surprisingly, the added polyester fibers, originating from the shredded production waste material, do not negatively impact the overall performance of the core layer produced. To the contrary, it was found that the small amount up to 12% of polyester increased the stiffness of the layer and counterbalanced the elastomeric properties of the post-consumer TPO-based material. Step 200 illustrates combining the fibrous outer layers 3 and 8 to the core layer 7. Step 300 illustrates the formation of the trim part 4.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. An automotive trim part made of a laminated structure comprising:
    a thermoplastic core layer and fibrous cover layers that comprise polyester fibers, whereby the thermoplastic core layer is sandwiched between the fibrous cover layers, and whereby the thermoplastic core layer comprises an extrudate of a mixture of at least:
        feedstock A formed at least partially from ground or shredded trim part waste of a first character, comprising thermoplastic olefin elastomer based materials, and
        feedstock B formed from ground or shredded trim part waste of a second character comprising a laminated structure comprising at least a thermoplastic core panel comprising thermoplastic olefin elastomer and fibrous cover members that include polyester fibers.

2. The automotive trim part of claim 1, wherein the thermoplastic core panel and the thermoplastic core layer are of the same construction, and the fibrous cover layers and fibrous cover members are of the same construction.

3. The automotive trim part of claim 1, wherein the trim part waste is at least partially comprised of a mixture of polypropylene and a thermoplastic olefin elastomer.

4. The automotive trim part of claim 1, whereby feedstock A further comprises an inert filler.

5. The automotive trim part of claim 1, wherein the thermoplastic core layer comprises inert filler up to 25% by weight of the thermoplastic core layer.

6. The automotive trim part of claim 1, wherein feedstock A comprises a mixture of at least polypropylene and a synthetic rubber component.

7. The automotive trim part of claim 6, wherein the synthetic rubber component is ethylene propylene diene monomer (EPDM), whereby the EPDM in the mixture comprises between 5-30% by weight in the mixture.

8. The automotive trim part of claim 1, whereby the thermoplastic core layer comprises polyester derived from feedstock B, and whereby the total polyester content is less than 12% by weight of the core layer.

9. The automotive trim part of claim 1, whereby the area weight of the fibrous cover layers is up to 450 g/m$^2$.

10. The automotive trim part of claim 1, whereby at least one of the fibrous cover layers comprises a thermoplastic binder.

11. The automotive trim part of one of claim 1, whereby the area weight of the thermoplastic core layer is between 500 and 3000 g/m².

12. The automotive trim part of one of claim 1, whereby feedstock A is derived from recycled bumper fascias based on thermoplastic olefinic elastomers.

13. The automotive trim part of claim 1, further comprising at least partially a felt layer laminated to a surface of the trim part configured to face a wheel well.

14. The automotive trim part of claim 1, wherein the trim part is used as a fender liner, wheel arch trim part, seat back trim part, exterior trim part, or trim part in an engine bay.

15. An automotive trim part made of a laminated structure comprising:
a thermoplastic core layer comprising an extruded mixture of two materials obtained from waste materials, comprising:
a first waste material derived from post consumer materials comprised at least partially of thermoplastic olefin elastomer, a polyester fiber filler, and an inert filler, and
a second waste material derived from automotive trim part waste comprised of a laminated structure consisting of a thermoplastic core panel comprising thermoplastic olefin elastomer and fibrous cover members that include polyester fibers that has been ground, shredded, or otherwise separated.

16. The automotive trim part of claim 15, further comprising:
a first polyester fibrous cover layer;
a second polyester fibrous cover layer; and
wherein the thermoplastic core layer has a first side associated with the first polyester fibrous cover layer, and a second side associated with the second polyester fibrous cover layer.

17. The automotive trim part of claim 1, wherein feedstock A has been melt filtrated to reduce paint or paint additives.

18. The automotive trim part of claim 1, wherein the fibrous cover comprises glass fibers and an olefin-based binder.

19. The automotive trim part of claim 1, wherein feedstock B is made up to 50% by weight of the mixture of feedstock A and B, wherein feedstock A is added to the mixture to achieve a desired weight of the trim part.

20. An automotive trim part made of a laminated structure comprising:
an extruded thermoplastic core layer formed from a mixture of at least
a first feedstock formed from ground or shredded waste derived from post-consumer materials comprising:
a blend of thermoplastic polyolefin elastomeric material comprised of:
polypropylene-ethylene propylene diene monomer (PP-EPDM),
a polyester fiber filler, and
an inert filler,
a second feedstock derived from automotive trim part waste that has been ground or shredded, fibrous material; and
first and second polyester fibrous cover layers, wherein the thermoplastic core layer is sandwiched between the first and second fibrous cover layers.

21. The automotive trim part of claim 20, wherein the inert filler and fibrous materials comprise up to 40% by weight of the core layer, and the PP-EPDM comprise the remaining weight of the core layer.

22. The automotive trim part of claim 20, wherein at least one of the first and second polyester fibrous cover layers comprises a thermoplastic binder, the thermoplastic binder also being a component of the second feedstock.

* * * * *